United States Patent [19]

Forrester et al.

[11] Patent Number: 5,127,277
[45] Date of Patent: Jul. 7, 1992

[54] MEASURING LOADS ON VEHICLE WHEELS

[75] Inventors: John S. Forrester, West Midlands; Michael Appleyard, Lancashire, both of England

[73] Assignee: Lucas Industries Public Limited Co., Birmingham, England

[21] Appl. No.: 555,051

[22] Filed: Jul. 19, 1990

[30] Foreign Application Priority Data

Jul. 26, 1989 [GB] United Kingdom ............... 8917075
Jan. 30, 1990 [GB] United Kingdom ............... 9002054

[51] Int. Cl.$^5$ .................................................. G01L 5/00
[52] U.S. Cl. ................................. 73/862.54; 73/862.65
[58] Field of Search .................. 73/11, 862.49, 862.54, 73/862.65; 177/136, 137, 185; 340/438, 440, 666

[56] References Cited

U.S. PATENT DOCUMENTS

| | | | |
|---|---|---|---|
| 2,995,034 | 8/1961 | Boiten | 73/862.62 |
| 3,743,041 | 7/1973 | Videon | 73/862.65 X |
| 4,089,216 | 5/1978 | Elias | 73/862.31 |
| 4,285,234 | 8/1981 | Basily et al. | 73/862.65 |
| 4,458,234 | 7/1984 | Brisard | 340/438 |
| 4,727,352 | 2/1988 | Doller | 340/666 X |
| 4,800,751 | 1/1989 | Kobayashi et al. | 73/862.65 X |

FOREIGN PATENT DOCUMENTS 3726146 11/1988 Fed. Rep. of Germany .

Primary Examiner—Reinhard J. Eisenzopf
Assistant Examiner—E. Shopbell
Attorney, Agent, or Firm—Brown, Martin, Haller & McClain

[57] ABSTRACT

A load measuring device is incorporated in a damper or suspension strut of a vehicle. The device comprises an annular plate which is interposed between axially spaced opposite faces of a thrust bearing and an abutment for the adjacent end of the spring, and the plate is supported from the opposite faces at at least three angularly spaced locations of which a location on one side of the plate is disposed substantially at the mid-point in the circumferential length between a pair of locations on the opposite side of the plate. Bending moments in the plate are monitored by thick film technology to give a direct reading of load.

7 Claims, 5 Drawing Sheets

MEASURING LOADS ON VEHICLE WHEELS

This invention is concerned with the measurement of loads on vehicle wheels in order, for example, to provide an input signal for initiating operation of ancillary equipment such as an active suspension control system for the vehicle, or for altering the threshold of a braking system for the vehicle, suitably an anti-lock braking system.

Most known applications have been concerned with load monitoring on commercial vehicles using conventional load cell/strain gauge arrangements. In another construction displacement transducers have been employed to monitor the height between an axle and the chassis of a vehicle as a measure of vehicle load.

Known vehicle load measuring system are not normally arranged such that a direct measurement can be achieved. The accuracy of such systems is therefore often affected by spring rates and characteristics of dampers and the like. This means that individual vehicle calibration procedures will be required which is not a very practical proposition in a large scale automotive market.

We are aware of DOS 3726146 which discloses a load measuring device incorporated in a damper or suspension strut of a vehicle. In the construction described in DOS 3726146 the load measuring device is of ring-like configuration and is clamped in surface contact between the frame of a vehicle and a securing flange on the damper or strut by means of the conventional mounting bolts which pass through openings in the device. The device comprises a hard disc washer, and a second stiff plate for introducing a force to a piezo-resistive thick film resistor arranged between them. It is essential therefore that an appropriate torque is applied each bolt to ensure that the device is correctly calibrated. In addition the accuracy of the device may be affected by, when in use, temperature distortion.

According to our invention a load measuring device incorporated in a damper unit or suspension strut unit of a vehicle comprises at least one beam adapted to be subjected to bending moments which can be measured by measuring means responsive to such bending in order to provide a load measurement signal.

The moments may be monitored by use of thick film technology by means of which the emitted signals can be processed by electronic circuitry associated with the load measuring device.

The load measuring device may be adapted to be interposed between axially spaced opposite faces of a thrust bearing for one end of the unit and an abutment for the adjacent end of a coil suspension spring.

Alternatively the load measuring device may be located on top of the unit as a self contained assembly.

When the load measuring device is interposed between the thrust bearing and the abutment for the suspension spring, the device comprises at least two portions, each constituting a beam, and the ends of each portion are supported from the spaced opposite faces of the bearing and the abutment.

Conveniently the device comprises an annular plate which is supported from the opposite faces at least three angularly spaced locations of which a location on one side of the plate is disposed substantially at the mid-point in the circumferential length between a pair of locations for the opposite side of the plate.

The locations may comprise discrete projections for co-operation between the annular plate and the faces.

The projections may project from the plate itself for engagement with the faces, or they may be carried by a pair of mounting members between which the plate is sandwiched with the projections engaging with the plate. In this latter construction the plate and the mounting members are keyed together against relative rotation.

When the load measuring device is mounted on top of the unit, the device suitably comprises a load cell, and the load on the wheel acts directly on the load cell.

Conveniently the load cell comprises a disc adapted to include a central beam which is supported between projections so arranged that the beam is subjected to a three-point loading with the vehicle load being transmitted through the projections to cause bending moments to be set up in the beam.

Piezo-resistive strain sensing elements may be provided to monitor the stress set up in the beam due to the vehicle loading. When such elements are provided they may be arranged in a typical Wheatstone Bridge configuration.

Our load measuring devices can be easily installed in damper units or suspension struts without the need for addition calibration or adjustment during installation, and the devices can be used in front or rear suspension assemblies.

Some embodiments of our invention are illustrated in the accompanying drawings in which.

Figure 1:
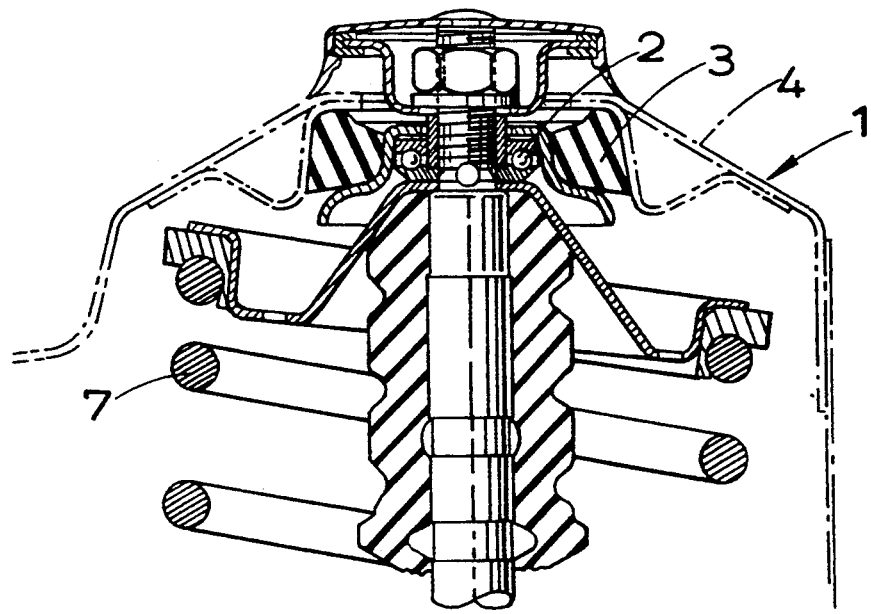
FIG. 1 is a section showing the upper end of a suspension strut unit for a vehicle.
Figure 2:
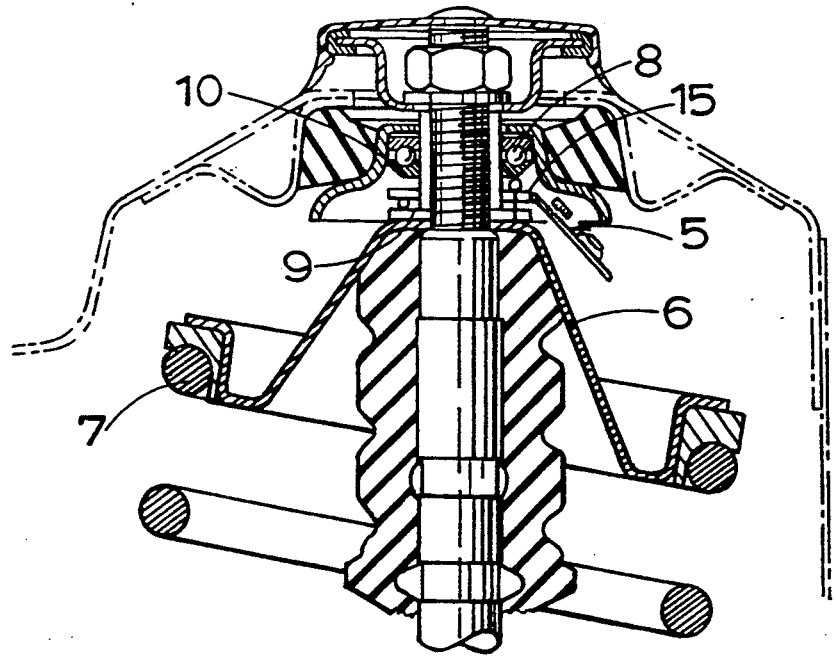
FIG. 2 is a section similar to FIG. 1 but showing the installation of the load measuring device.

The suspension units illustrated in FIGS. 1 and 2 of the accompanying drawings are adapted to support the load on a vehicle wheel through a spring/damper assembly 1 and thence through a thrust bearing 2 and an elastomeric mounting 3 to the body 4 of the vehicle. A load measuring device 5 is interposed between an abutment 6 for the upper end of the spring 7 of the assembly 1 and a thrust bearing 8 through which the weight of the body 4 is taken by the suspension unit. Thus the load on the wheel acts directly on the device 5. The device 5 is interposed between axially spaced planar parallel faces 9 on a steel ring in engagement with the abutment 6, and 10 on the bearing 8.

Figure 3:
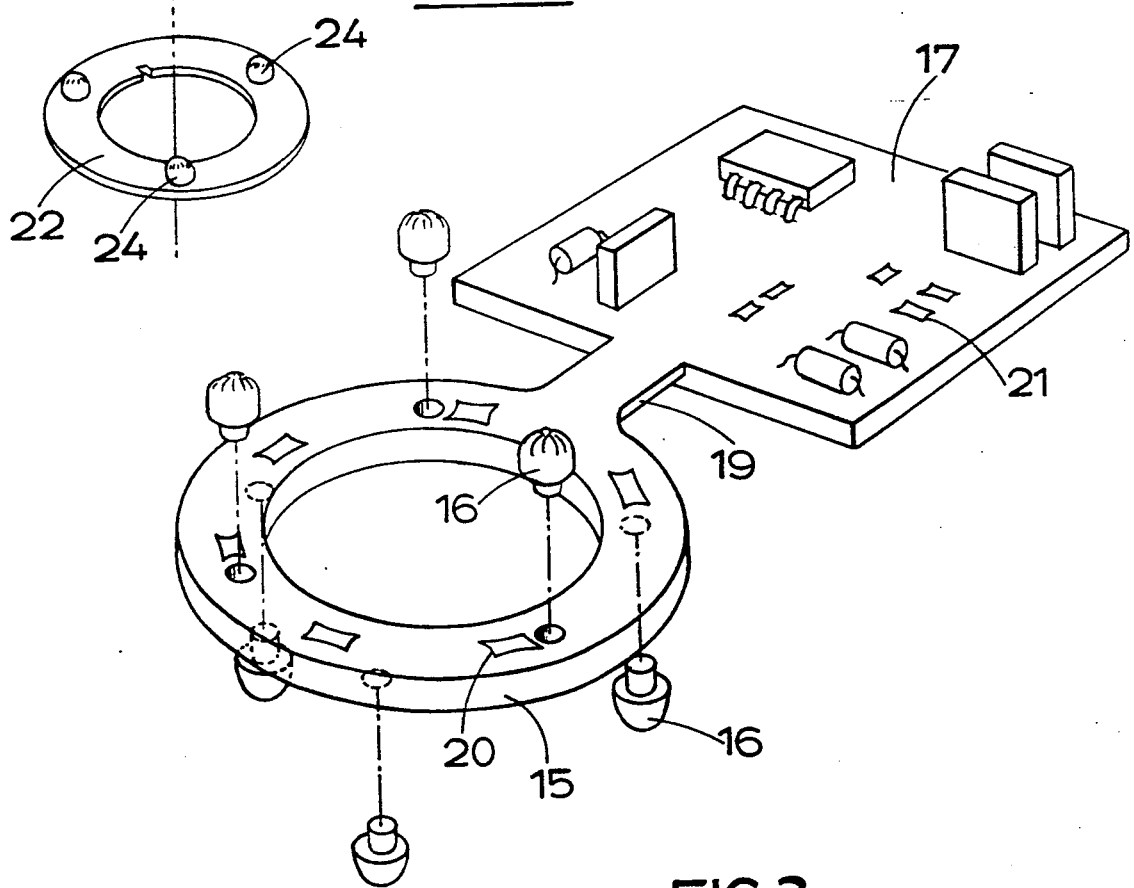
FIG. 3 is an exploded perspective view of the measuring device installed in the unit of FIG. 2.

One construction of the device 5 is shown in detail in FIG. 3 of the drawings.

As illustrated the device 5 comprises an annular steel member 15 which is provided on opposite sides with three projections 16 which are equally spaced angularly with respect to each other and with the projection 16 projecting from one side of the member 15 being angularly displaced by equal circumferential distances from an adjacent pair of projections on the other side of the member 15. The load is transmitted to the member 15 through the projections which therefore causes bending moments to be set up in the member.

The bending moments are monitored by thick film technology, and electronic signal processing circuitry is illustrated at 17 as part of the device 5. This has the advantage that both the member 15 and the processing circuitry can be screen printed at the same time, thereby providing a compact and cost effective assembly for the device 5. A thin neck 19 between the member 15 and the circuitry can then be formed to suit the installation requirement, as shown in FIG. 2.

The assembly is first screen printed on one surface with a glass/ceramic material, thermally matched to the steel, to provide an insulating layer followed by conductor tracks, and then piezo-resistive elements 20 for the member 15, and conventional resistors 21 for the circuitry. The whole surface, apart from the terminals, and also where discrete components are to be added, is finally screen printed with an overglaze which forms a protective layer for the resistors 21 and conductive tracks. Discrete components and the small projections 16 are then added to the device 5 to complete the assembly. Finally specific thick film resistors on the circuitry are laser trimmed to meet a given specification in terms of electrical output and temperature compensation.

Each alternate element 20 forms one arm of a Wheatstone Bridge, and three of the other elements 20 form the other arm of the bridge. Since all the elements are mounted on a common member 15, the device 5 compensates automatically for deformation due to temperature variations, and responds to deflection due to changes in the loading on the wheel.

The device 5 is engineered within the unit to give a direct measurement load which is independent of spring rate and unaffected by characteristics of the damper.

The device 5 is manufactured to a given specification pair assembly of the suspension unit and will not require further calibration after fitting to the vehicle. This also alleviates service and replacement problems.

Figure 4:
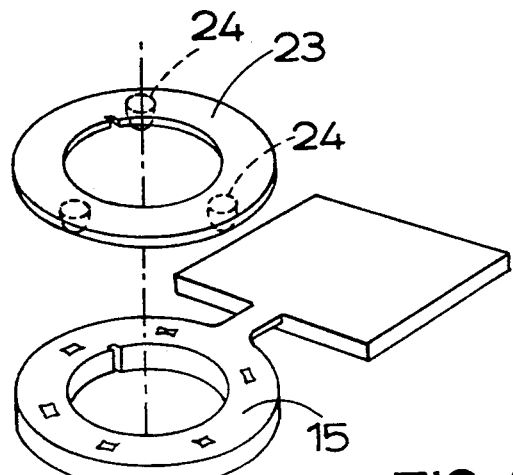
FIG. 4 is an exploded perspective view of another measuring device.

In the modification shown in FIG. 4 of the drawings the annular steel member 15 is of planar construction, and is located between a pair of superimposed mounting member 22, 23, each of which comprises an annular plate conveying three angularly spaced projections 24 similar to the projections 16. In this construction, however, the projections 24 engage with opposite faces of the member 15 with the plates 22 and 23 in engagement with the respective faces 9, 10.

Figure 7:
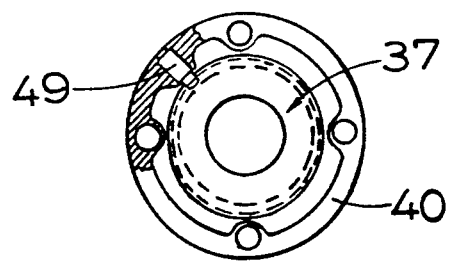
FIG. 7 is a plan of the load cell.
Figure 6:
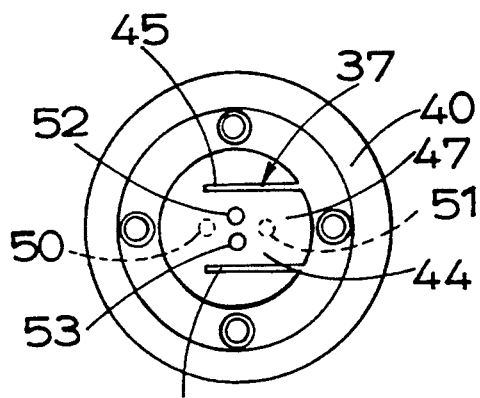
FIG. 6 is a section substantially on the line 6—6 of FIG. 5.
Figure 5:
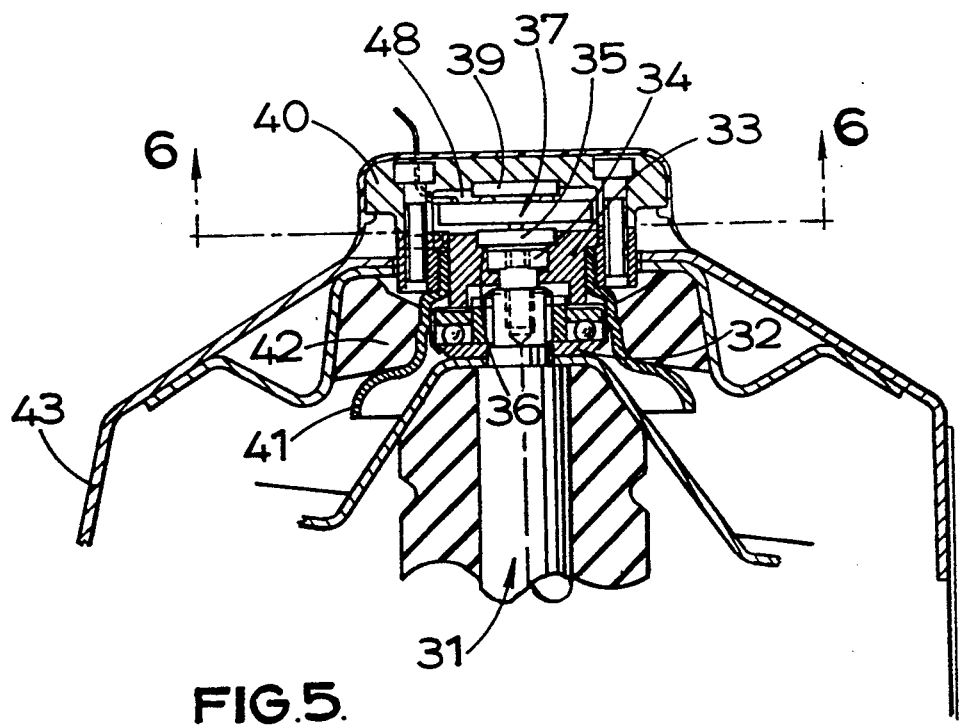
FIG. 5 is a section showing the upper end of another suspension strut unit for a front wheel of a vehicle.

The suspension unit illustrated in FIGS. 5-7 of the accompanying drawings supports the load on the front wheel of a vehicle through a spring/damper assembly 31, a thrust bearing 32, and annular spacer 33, a thrust button 34 mounted in a recess in the upper end of the spacer 33, a thrust button 35 received in a counterbored recess 36 in the upper end of the spacer with the button 35 in abutment with a face defining the base of the counterbored recess 36, a load cell 37, an upper thrust button 39, a load cell housing 40 containing the load cell 37, a strut top mounting plate 41, a strut top mounting rubber 42, and so on to the vehicle body 43.

The load cell 37 comprises a circular disc 44 provided with a pair of parallel machined slots 45, 46 extending in the same direction to define a central, cantilever, type beam 47. The disc 44 is keyed in the housing 40 against relative rotation by means of a dowel pin 49.

The thrust buttons 35 and 39 are spaced from adjacent sides of the disc 44 by pairs of projections 50, 51, and 52, 53. The projections 50, 51 are spaced from each other on a line parallel with, and spaced between, the slots 45 and 46, and the projections 52 and 53 are relatively close together, lying at the centre of the beam of a second line normal to the line of the projections 50 and 51 with the projections 52 and 53 disposed on opposite sides of the second line. The arrangement of the projections forms a three-point loading beam, and the vehicle load is transmitted through the projections to cause bending moments to be set up in the beam 47.

The space 48 in the housing 40 which surrounds the load cell 37 is filled with a suitable low modular putty compound. This retains the load cell 37 in position.

Figure 9:
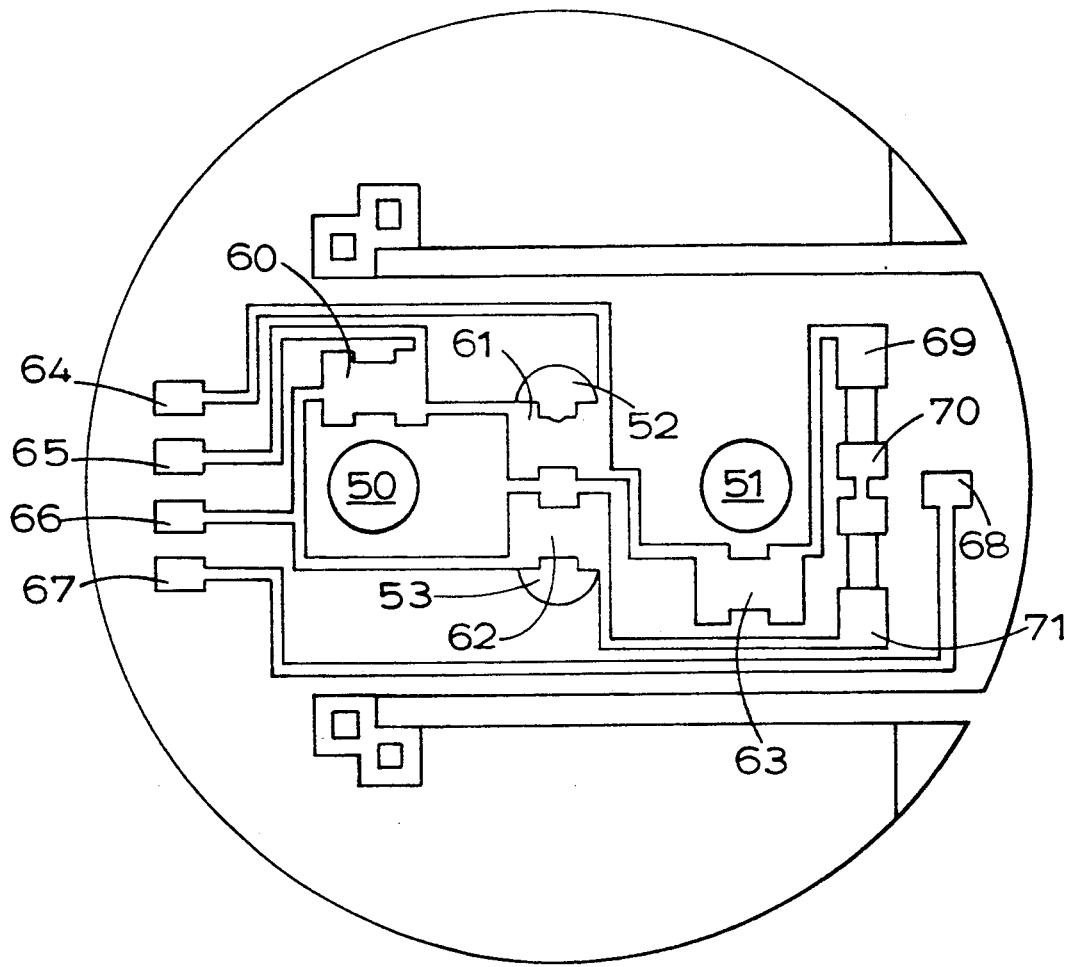
FIG. 9 is a view of a screen printed Wheatstone Bridge circuit for the load cell of the unit of FIGS. 5-8.

A thick film screen printed Wheatstone Bridge circuit, illustrated in FIG. 9, is applied to the load cell 37 to monitor the stresses set up in the beam due the vehicle loading, and the putty filling the space 48 also acts to protect the printed circuit. Specifically the stresses are monitored by piezo-resistive strain sensitive elements 60, 61, 62, 63, from which the signals are fed to output connections 64, 65, 66 and 67 through conductive tracks.

The arrangement also gives the facility of balancing the bridge by means of a balancing resistor, suitably laser trimmed. This is achieved by connecting a terminal pad 68 from the output connection 67, to terminal pads 69, 70 and 71, by wire bonding or by soldering a wire jumper to the terminal pads 69, 70, 71.

In a modification the balancing resistors may be of the discrete surface mount type.

The balancing resistors are positioned in an area of low stress in the beam 47 and are thus not effected substantially by stresses induced in the beam 47 by the vehicle loading. Preferably the balancing resistors have the same temperature coefficient of resistance (TCR) as the resistors 60, 61, 62, 63 to give an improved operating temperature performance for the whole assembly.

Figure 8:
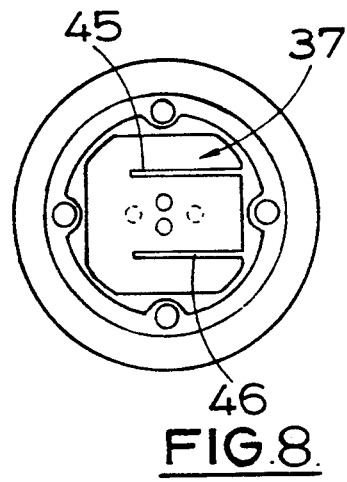
FIG. 8 is a view similar to FIG. 6 but showing a modified load cell.

In a modification shown in FIG. 8, the load cell 37 comprises a substantially square element.

Figure 11:
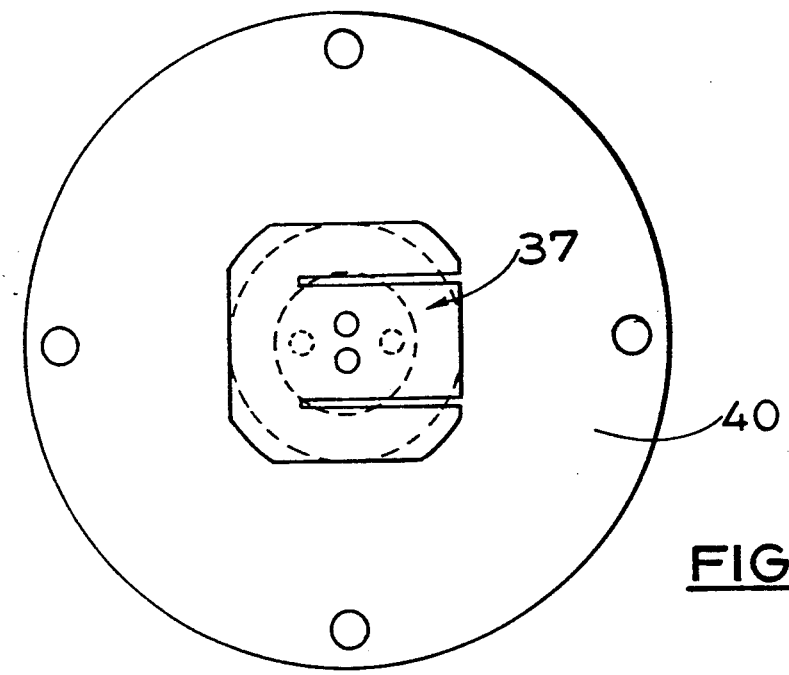
FIG. 11 is a plan of the load cell of FIG. 10.
Figure 10:
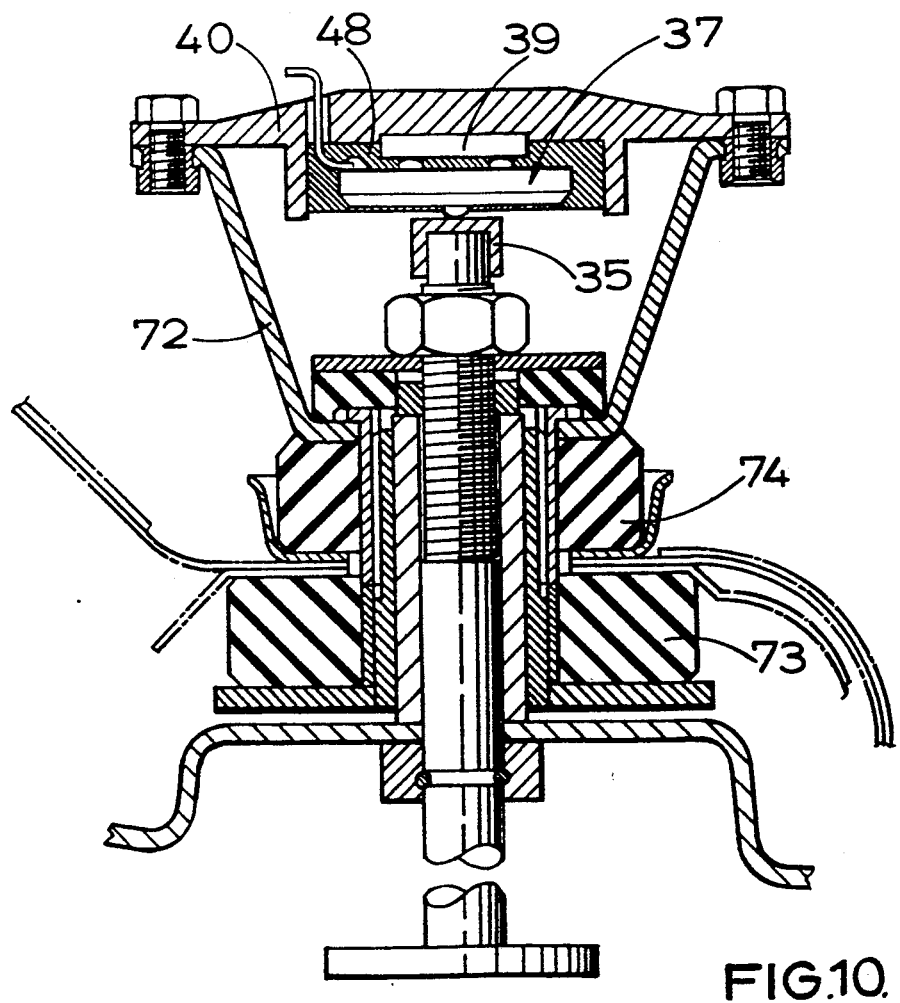
FIG. 10 is a section through the upper end of another suspension strut unit for a rear wheel of a vehicle.

As illustrated in FIGS. 10 and 11 the load cell described above can also be used with a rear suspension assembly.

In this construction the housing 40 is carried from a cup 72 clamped by a flange at its lower end between a lower resilient mounting block 73 and an upper mounting block 74.

The construction and operation of the embodiment of FIGS. 10 and 11 is therefore the same as that of FIGS. 5-8, and corresponding reference numerals have been applied to corresponding parts.

We claim:

1. A load measuring device to be incorporated in a vehicle wheel load supporting unit of a vehicle having a thrust bearing for one end of said unit, and an abutment for an adjacent end of a coil suspension spring spaced from said thrust bearing, wherein said device comprises at least one beam which is interposed between said thrust bearing and said abutment and is subjected to bending moments, and measuring means to provide a load measurement signal in response to said bending moments.

2. A load measuring device as claimed in claim 1, wherein said beam comprises an annular plate which is supported from the opposite faces at least three angularly spaced locations of which a location on one side of said plate is disposed substantially at the mid-point in the circumferential length between a pair of locations on the opposite side of said plate.

3. A load measuring device as claimed in claim 1, wherein said device comprises at least two portions, each constituting a beam, and ends of each said portion are supported from spaced faces of said bearing and said abutment.

4. A load measuring device as claimed in claim 2, wherein said locations comprise discrete projections for co-operation between said annular plate and said faces of said bearing and said abutment.

5. A load measuring device according to claim 1, wherein said measuring means comprise piezo-resistive strain sensing elements arranged in a Wheatstone Bridge configuration to monitor stress set up in said beam due to vehicle loading.

6. A load measuring device to be incorporated in a vehicle wheel load supporting unit for supporting the load a wheel of a vehicle, said device being located on the top of said unit as a self-contained assembly, wherein said device comprises at least one beam subjected to bending moments, measuring means to provide a load measurement signal in response to said bending moments and a load cell, said wheel acting directly on said load cell, wherein said load cell comprises a disc to include a central beam and projections for supporting said beam between them are so arranged that said beam is subjected to a three-point loading with said vehicle load being transmitted through said projections to cause bending moments to be set up in said beam.

7. A load measuring device according to claim 1, wherein said measuring means comprise piezo-resistive strain sensing elements arranged in a Wheatstone Bridge configuration to monitor stress set up in said beam due to vehicle loading.

* * * * *

UNITED STATES PATENT AND TRADEMARK OFFICE
CERTIFICATE OF CORRECTION

PATENT NO. : 5,127,277

DATED : July 7, 1992

INVENTOR(S) : John S. Forrester and Michael Appleyard

It is certified that error appears in the above-identified patent and that said Letters Patent is hereby corrected as shown below:

Column 4, Line 68 insert --at-- after "at".

Column 6, Line 3 insert --on-- after "load".

Signed and Sealed this

Second Day of November, 1993

Attest:

BRUCE LEHMAN

Attesting Officer     Commissioner of Patents and Trademarks